United States Patent [19]
Simonetti

[11] Patent Number: 6,158,391
[45] Date of Patent: Dec. 12, 2000

[54] TREAT DISPENSING TOY

[76] Inventor: Anthony Garret Simonetti, 460 Oceanside St., Islip Ter., N.Y. 11752

[21] Appl. No.: 09/351,192

[22] Filed: Jul. 9, 1999

[51] Int. Cl.[7] .................................................. A01K 29/00
[52] U.S. Cl. ........................................ 119/707; 119/702
[58] Field of Search ..................... 119/707, 702, 119/711, 710; D30/160; 446/496, 325

[56] References Cited

U.S. PATENT DOCUMENTS

| | | | |
|---|---|---|---|
| 3,999,519 | 12/1976 | Rodemeyer | 119/29 |
| 5,213,232 | 5/1993 | Kraft et al. | 221/277 |
| 5,343,828 | 9/1994 | Houghton et al. | 119/51.03 |
| 5,351,652 | 10/1994 | Budman et al. | 119/711 |
| 5,390,629 | 2/1995 | Simone | 119/711 |
| 5,553,570 | 9/1996 | VanNatter, III et al. | 119/709 |
| 5,813,366 | 9/1998 | Mauldin, Jr. | 119/710 |
| 5,819,690 | 10/1998 | Brown | 119/707 |
| 5,865,147 | 2/1999 | Rubin | 119/711 |
| 5,870,971 | 2/1999 | Krietzman et al. | 119/707 |

OTHER PUBLICATIONS

Mail Order Catalog, "Valley Vet Supply", Summer 1999 Equine Edition, p. 55 (top).
Mail Order Catalog, "Valley Vet Supply", Spring 1999 Edition, p. 15.

Primary Examiner—Peter M. Poon
Assistant Examiner—Judith A. Nelson
Attorney, Agent, or Firm—Island Patent Associates

[57] ABSTRACT

A treat dispensing toy including a middle portion and pair of spaced disk portions of differing diameters, which are fixed to the middle portion. The toy is structured to enable treats or snacks to be dispensed from an interior chamber when an animal causes the toy to roll and rotate one or more revolutions. The disk portions may be removably fixed to the middle portion to facilitate filling and cleaning activities of the interior chamber, which is formed by the disk portions and a wall structure of the middle portion. The wall structure of the middle portion includes a treat dispensing opening to dispense treats in a controlled manner. The toy is intended to dispense treats, while engaging and entertaining an animal, and at the same time is arranged to maintain position within an inherently restricted play or holding area.

16 Claims, 5 Drawing Sheets

TREAT DISPENSING TOY

BACKGROUND OF THE INVENTION

1. Field of the Invention

The present invention relates to toys for use with animals. More particularly, the invention relates to tilted treat dispensing toys structured for use with animals including equines, dogs, etc.

2. Description of the Prior Art

The need to entertain animals, especially when unattended for periods of time is well known in the art. For example, toys employed with domestic animals, such as those constructed of latex and other suitable materials, enable an animal to be amused and entertained while alone. Further, suitable toys will often prevent an animal from chewing or damaging an item such as a shoe or a piece of furniture. When considering equine animals, which are considered to be very intelligent, there is a tendency for these animals to become bored when left unattended. As a result, these animals have been known to chew railings, barn stall doors and partitions, and other available nearby items.

The prior art provides many examples of toys that have been devised to entertain and amuse animals. U.S. Pat. No. 5,352,652 awarded to Budman, et al. provides an example of a simple spherical ball-like toy intended for use with equine animals. However, devices such as that disclosed by Budman, provide no encouragement or inducement for an animal to be engaged (by the toy), especially after a period of time has passed and the animal has become accustomed to the toy.

Other toys and devices have been constructed that encourage interaction by dispensing pieces of food, or what may be generally termed 'treats'. For example, U.S. Pat. No. 5,865,147 to Rubin teaches a canister or container device having a plurality of openings to dispense a meal to an animal. Devices of this type suffer from some fundamental problems. First, as the container or body of the toy is rotated a treat which doesn't fully eject may pick up sand, small pebbles, and or other ground surface debris. This may especially be the case if the treats are provided as cut-up pieces of fruit or vegetable. As such, the sand, pebbles, and or debris items may eventually be ingested by the animal—possibly in significant quantities. In addition, the rotation of these devices may aid in contaminating the entire lot of treats housed within an interior chamber.

Another problem, which is common with many toys and entertainment devices, is that the device may easily be moved to a perimeter of a desired holding area, for example a property line or a fence/wall in a holding pen. These devices may then be difficult or impossible for an animal to continue to use and play with. It would be most desirable to structure a device so that it will be maintained in a fixed, easily determined, and limited area or region. Further, it would be most preferred to provide a device that dispenses treats and small pieces of food, while remaining in a restricted and predictable area. Therefore, while the known devices available in the art are suitable for their intended uses, there is a need for new and improved treat dispensing devices and toys having been structured and arranged to overcome one or more of the above listed problems, and possibly others which have not been explicitly discussed.

A full understanding of the present invention, including an understanding of a number of capabilities, characteristics, and associated novel features, will result from a careful review of the description and figures of several preferred embodiments provided herein. Attention is called to the fact, however, that the drawings and descriptions are illustrative only. Variations and alternate embodiments are contemplated as being part of the invention, limited only by the scope of the appended claims.

SUMMARY OF THE INVENTION

In accordance with the present invention a treat dispensing toy is arranged to dispense animal treats when rotated about a tilted center longitudinal axis. The treat dispensing toy includes a middle portion formed with a substantially cylindrical wall structure of a pre-determined diameter, having a center axis substantially aligned with the tilted center longitudinal axis of the toy. The middle portion is arranged having a first end and a second end, located at opposite ends of the cylindrical wall structure thereof. The wall structure includes a suitably or appropriately sized treat dispensing opening, which is located proximate to the second end in the cylindrical wall structure. Further included are a plurality of spaced disk portions. Specifically, preferred embodiments would include a first disk portion substantially axially aligned along the center axis, and fixed to the first end of the middle portion. The first disk portion is preferably oriented so as to extend radially from the center axis and establish a circumferential outer perimeter while capping and closing the first end (of the middle portion). The first disk portion is arranged having a circumferential outer perimeter with a pre-determined diameter selected to be greater than the pre-determined diameter of the middle portion. A second disk portion may also be included and substantially axially aligned with the center axis of the cylindrical wall structure of the middle portion, and fixed thereto at the second end. The second disk portion is configured having a circumferential outer perimeter with a pre-determined diameter greater than that of the middle portion and less than that of the first disk portion, and is arranged to cap and close the second end of the middle portion. It may be noted that the diameters of the first disk portion and second disk portion are selected so that when the treat dispensing toy is supported by a ground supporting surface the first end of the cylindrical middle portion is elevated above the second end. This arrangement produces the tilted center (longitudinal) axis, causing any treats located within an interior chamber (preferably formed by the wall structure of the middle portion, the first disk portion, and the second disk portion) to be drawn to the second end and eventually discharged. Preferably, the treats are discharged one at a time, through the opening in the wall structure as the treat dispensing toy is rotated.

It should be understood that the treat dispensing toy is configured with the pre-determined diameter of the first disk portion being suitably and observably greater than the pre-determined diameter of the second disk portion to also cause the toy to be maintained within a somewhat restricted area of a ground supporting surface as the toy is caused to rotate by nudging impulses applied by an animal. The actual area that the toy would be maintained within would be determined by a relative difference in the diameters of the first disk portion and the second disk portion.

The treat dispensing toy may further include a means to prevent the toy from tipping on-end, thereby preventing the center axis to be maintained in a position substantially perpendicular to the ground surface. In preferred embodiments, said means to prevent the toy from tipping on end may include a first hemispherical cap-like protrusion fixed to the first disk portion and a second hemispherical cap-like protrusion fixed to the second disk portion. In addition, the treat dispensing toy of the present invention may include at least one offset mass provided to encourage the toy to come to rotational rest, after a nudging by an animal, in a preferred position with the treat dispensing opening situated with an upward orientation. The offset mass thereby positioning the treat dispensing opening upward when at rotational rest to require an animal to nudge and rotate the toy to dispense a next respective treat, while preventing treats from dropping out of the opening (when the toy is at rest and not rotating).

Preferred embodiments of the treat dispensing toy may also include a traction means provided on at least one of the first disk portion and the second disk portion, about the circumferential outer perimeter thereof The traction means would be provided on the first disk portion and or the second disk portion to aid in the rotating of the toy as the nudging impulses are applied by an animal.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

PARTIAL LIST OF REFERENCE NUMERALS 10a, 10b—treat dispensing toy
12a—first disk portion
12b—second disk portion
14—middle (cylindrical) portion
14a13 first end (of middle portion 14)
14b—second end (of middle portion 14)
16—wall structure (of middle portion 14)
18—treat dispensing opening
18a—annular insert
20a—first hemispherical cap
20b—second hemispherical cap
22—internal chamber
24—radially extending projections
28—concave notches
32—partition walls
34a—upper cavity
34b—lower cavity
38—filling openings (with plug)
40—short collar
48—center axis
50—ground supporting surface

DETAILED DESCRIPTION OF THE INVENTION

It is important to establish the definition of several terms and expressions that will be used throughout this disclosure. The term 'tilted center axis' will be used to describe a tilted or angled center axis of a middle portion of the invention, which is preferably of a generally cylindrical shape. It may further be noted that the tilted center axis extends axially through each of a first and second disk portions, which will be discussed fully below. The term 'treat' may be assumed to be any item, snack, candy, etc., which is most preferably provided between meals, and is attractive and desirable to an animal that the treat dispensing toy may be used with. Typically, chunks or small portions of treats may be sized having a diameter of ¼ to 1 inch. However, the actual or preferable size of the treats may be determined by the size of the animal that the invention is used with, or alternately, by the size of a treat dispensing opening provided with the embodiments of the invention. Other important terms and definitions will be provided, as they are needed, to properly and concisely define the present invention and its associated novel characteristics and features.

Figure 1A:
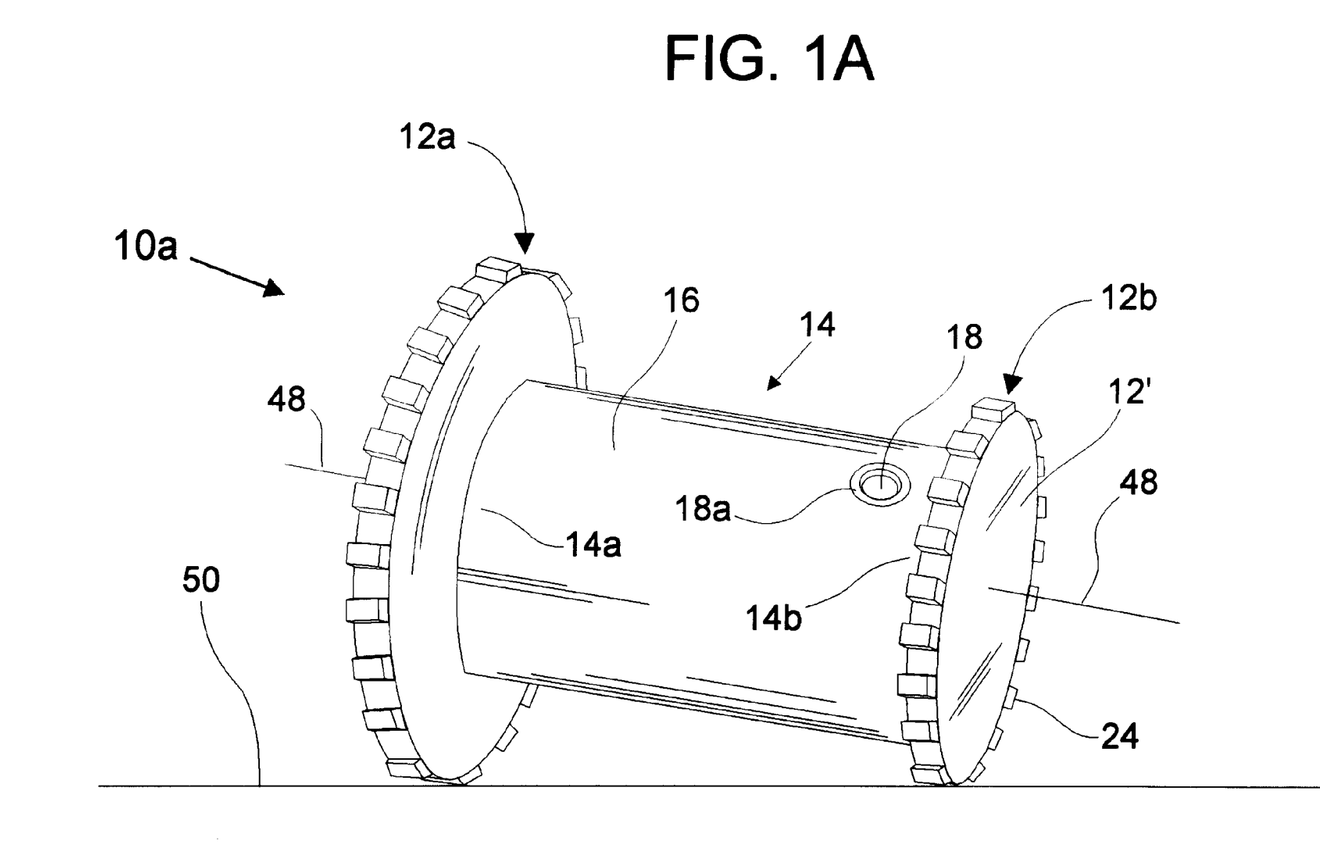
FIG. 1A and FIG. 1B illustrate perspective views of several preferred embodiments of a treat dispensing toy in accordance with the present invention.
Figure 1B:
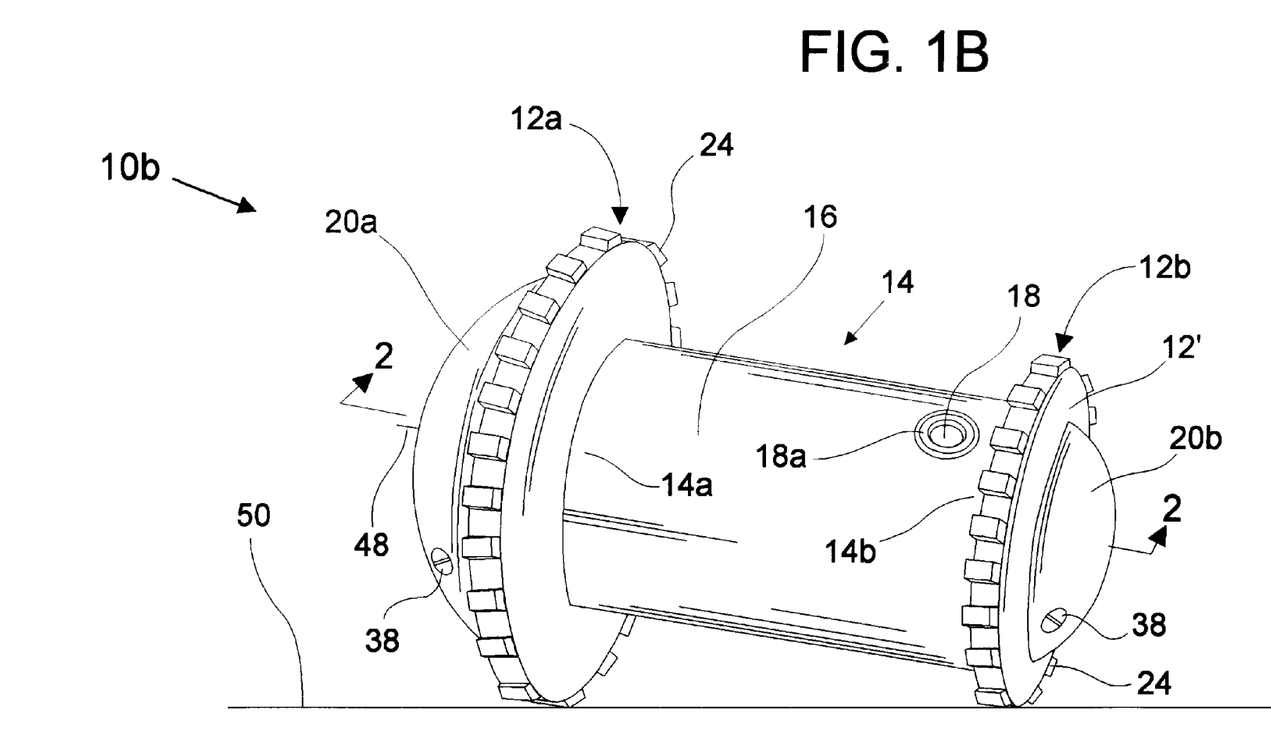
Figure 2:
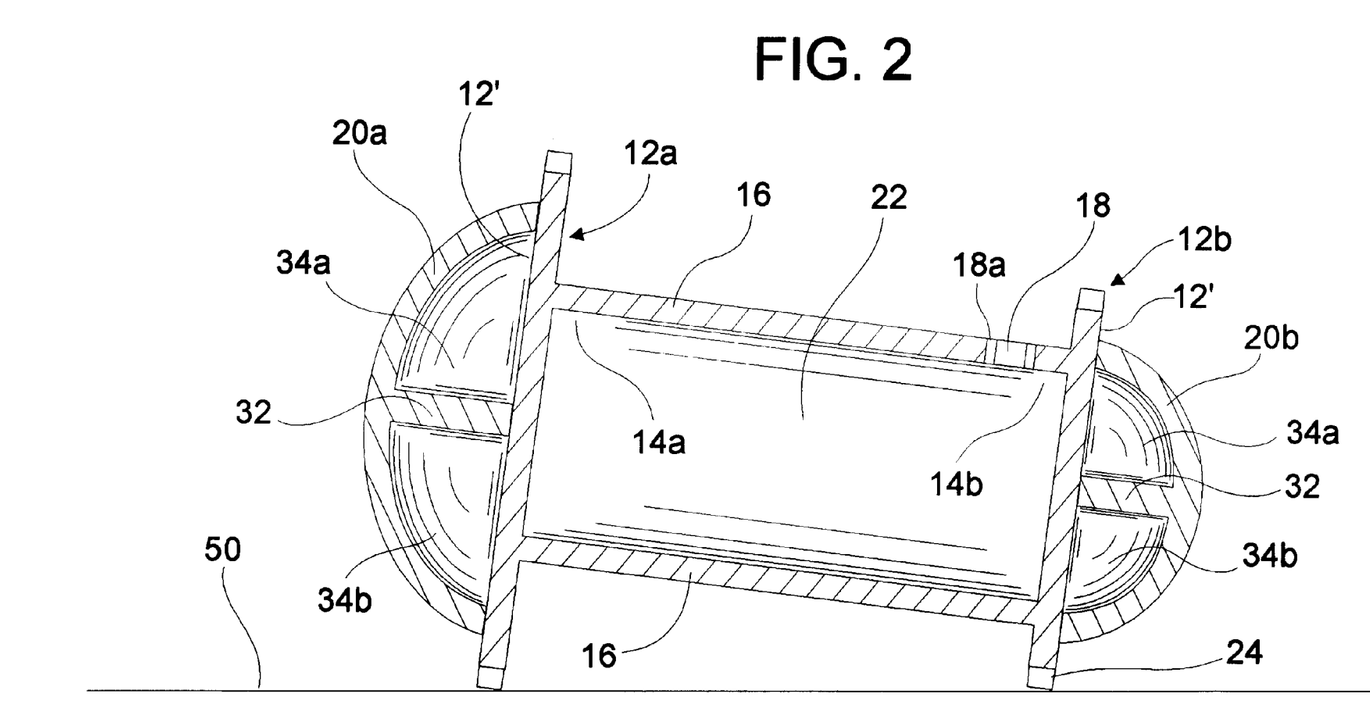
FIG. 2 depicts a cross sectional view of the embodiment of FIG. 1B along the line 2—2 of FIG. 1B.

Referring now to FIG. 1A, there is illustrated a therein a treat dispensing toy 10a having a tilted center axis 48. The treat dispensing toy 10a is structured with a first disk portion 12a and a second disk portion 12b, which are suitably spaced, and preferably or suitably substantially axially aligned along the tilted center axis 48 of the toy 10a. Each of the first and second disk portions, 12a and 12b respectively, which extend substantially radially from the center axis 48, form circumferential outer perimeters (i.e., rolling surfaces). Importantly, the first disk portion 12a is configured having pre-determined diameter that may preferably be observably greater than a pre-determined diameter of the second disk portion 12b. Also included is a middle portion 14 that is configured with a preferably (substantially) cylindrical wall structure 16. The middle portion 14 has a first end 14a and a second end 14b, and a pre-determined diameter selected to be less than the diameter of the second disk portion 12b. That is, the diameter of the middle portion 14 most preferably would be somewhat less than that of the second disk portion 12b, and possibly significantly less than the first disk portion 12a. As indicated above, the middle portion 14 is substantially aligned along the center axis 48 of the toy 10a, and further is structured with a suitably sized treat dispensing opening 18. As can be seen in FIGS. 1A and 1B, the opening 18 is most preferably located proximate to the second end 14b. The location of the treat dispensing opening 18 is important as the tilted center axis 48 will cause treats to be moved toward the second end 14b of the middle portion 14, faciliating the discharging of said treats from an interior chamber 22 (as shown in FIG. 2) via opening 18.

As can be seen in FIG. 1A, the first disk portion 12a is fixed (possibly in a removable way) to the middle portion 14 at the first end 14a thereof, to cap and close the first end 14a. Similarly, the second disk portion 12b is fixed to the middle portion 14 at the second end 14b, to cap and close the second end. The first disk portion 12a, the middle portion 14 and the second disk portion 12b, are arranged to form the interior chamber 22 (as shown in FIG. 2). The internal chamber 22 is intended to hold a plurality of treats (not illustrated) that will be dispensed from the toy 10a through the opening 18, preferably one at a time, as the toy is caused to rotate. It is contemplated that the rotation of the toy 10a, 10b, and equivalents, may be caused by nudging impulses applied by an animal. As can be seen in FIGS. 1A, 1B, and 2, the tilted center axis 48 of the toy 10a and 10b, results when the toy is supported by a ground supporting surface 50. Further, as skilled persons will appreciate, as the toy 10a or 10b is nudged and caused to rotate, the differing diameters of the first disk portion 12a and the second disk portion 12b, will cause the toy to remain within a somewhat restricted region or preferred area of the ground supporting surface 50.

Figures 3A, 3B:
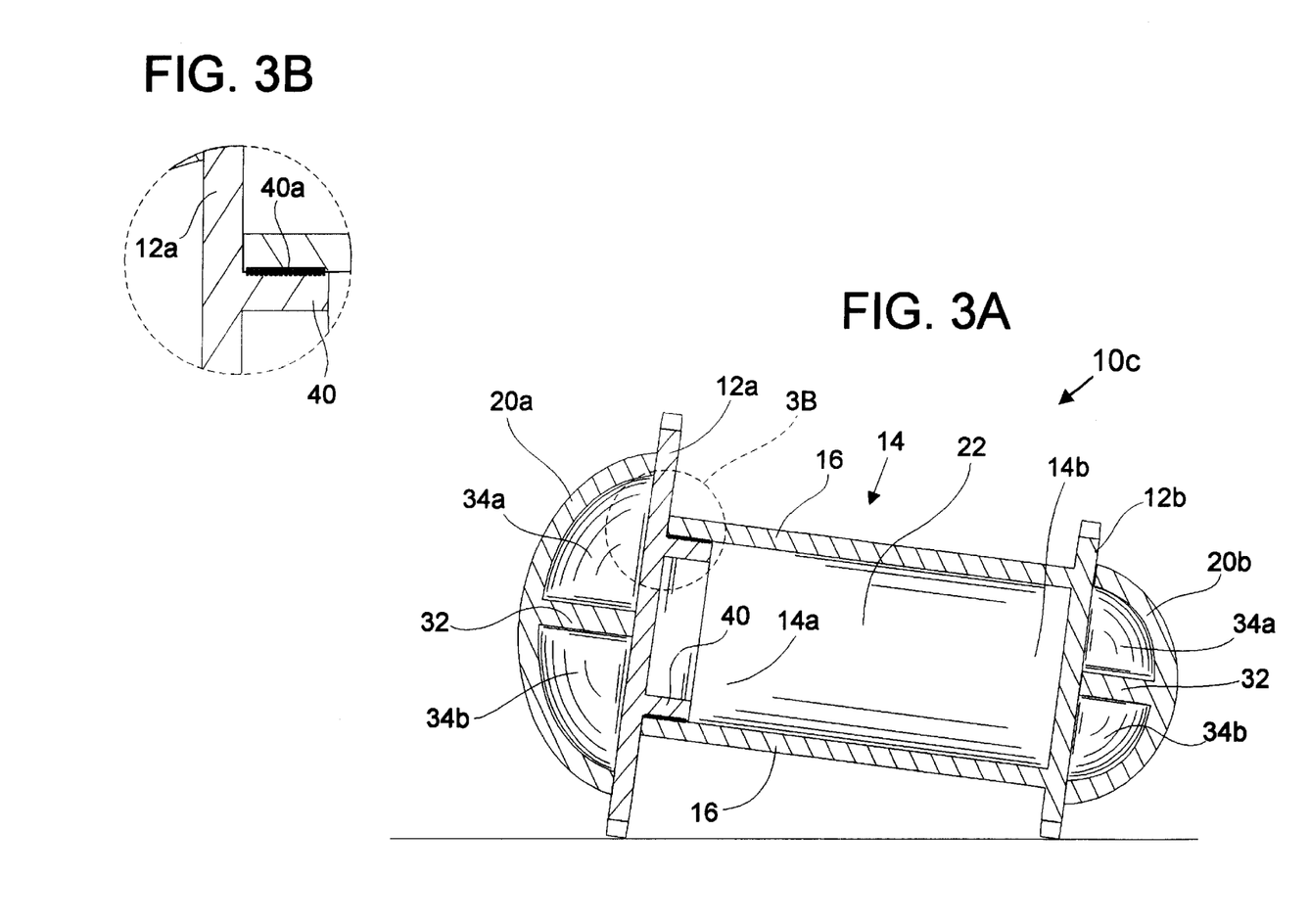
FIG. 3A provides a cross sectional view of another embodiment in accordance with the invention.
FIG. 3B illustrates one example of an arrangement providing for a removably fixed portion, which enables access to the interior chamber for filling and cleaning activities.
Figure 4:
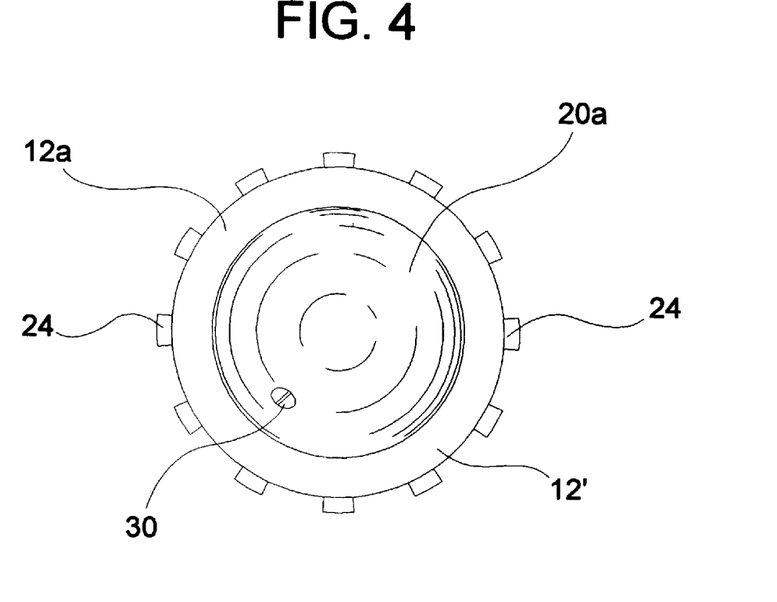
FIG. 4 provides an end view of a first traction means in the form of a plurality of radially extending projections.
Figure 5:
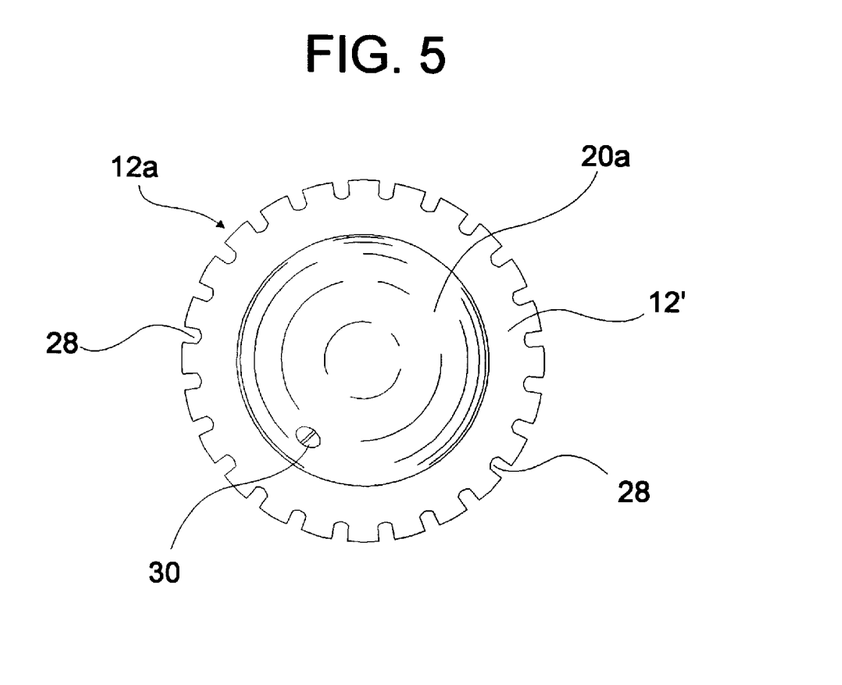
FIG. 5 provides an end view of another embodiment of a traction means in the form a plurality of concave notches.

As can be readily seen in each of FIGS. 1A through 5, at least one of the first disk portion 12a and the second disk portion 12b may be configured to include traction means. The traction means, which may be structured as radially extending projections 24 or concave notches 28, may be provided about the circumferential outer perimeter of the first disk portion 12a and or the second disk portion 12b. The traction means may be included to prevent the toy 10a or 10b, from sliding across the ground supporting surface 50, thereby preventing the toy from rotating and dispensing treats as desired. Two preferred arrangements of traction means are illustrated in FIGS. 4 and 5. Other simple arrangements to provide the desired traction may be provided by skilled individuals.

Another feature of the present invention is illustrated by way of a preferred embodiment in FIG. 1B. As can be seen therein, the toy 10b may include a first hemispherical cap (or cap-like projection) 20a and a second hemispherical cap 20b. Each cap, 20a and or 20b, is fixed to a respective disk portion (12a and or 12b, respectively), as illustrated, to prevent the toy 10a/10b from tipping on-end. Accordingly, the first hemispherical cap 20a and the second hemispherical cap 20b, or equivalent functional structures, may be provided to prevent the toy 10a from tipping on end and being maintained with the center axis 48 thereof in a position substantially perpendicular or orthogonal to the ground supporting surface 50. It is contemplated that the present invention may also be less likely to tip if the longitudinal length of the middle portion 14 is increased or extended (beyond that illustrated). This may provide a most preferred embodiment wherein a greater 'spacing' between the first disk portion 12a and the second disk portion 12b leads to a greater stability preventing or reducing the possibility of the toy tipping on-end. Importantly, as skilled persons would understand, other arrangements may be substituted for the hemispherical caps 20a and or 20b to prevent the toys 10a and 10b from tipping on-end As such it should be noted that any suitable means, including the preferred arrangement illustrated and described above, may be termed 'a means to prevent the toy from tipping on-end', and is to be considered within the scope of the claimed invention.

It would also be desirable to provide a means to enable the toy 10a or 10b to come to 'rotational rest' in what may be termed 'a preferred position with the treat dispensing opening situated with an upward orientation'. Accordingly, a suitable means may be included to strongly encourage the upward orientation to result after an animal applies a nudging impulse that causes the toy 10a, 10b, or 10c, or equivalents thereof, to rotate (and roll) one or more rotations. The rotations preferably resulting in the discharging of a treat from the interior 22 chamber via opening 18.

When the toy 10a is embodied including the first and second hemispherical caps (20a and 20b), as shown in FIG. 1B, a partition wall 32 may be provided in each of the hemispherical caps (best seen in FIGS. 2 and 3A). The partition walls 32 would most preferably provide for the secure partitioning of a space (or volume) formed by a side wall 12' of a respective disk portion 12a and or 12b, and a hemispherical cap being fixed to said side wall 12'. This partitioning will produce an upper cavity 34a and a lower cavity 34b. Each of the upper cavity 34a and the lower cavity 34b may be generally termed an 'offset sub-chamber'. As can be seen in FIGS. 2 and 3A, the lower cavity 34b is in a lower position and situated under the upper cavity 34a when the toy 10b is in the preferred resting position (with opening 18 having with an upward orientation). A filling opening 38 (having a removable plug) is arranged to provide access to the lower chamber 34b to enable an offset mass to be placed therein. Accordingly, the offset mass would shift the center of gravity from the center axis 48 to a lower (or offset) location. This arrangement may be provided to strongly encourage the upward orientation of the opening 18 to result after an animal applies a nudging impulse and causes a rotation of the toy of the present invention.

It should be noted that only a single offset mass associated with, or mounted upon one of the first disk portion 12a or the second disk portion 12b, may be provided with embodiments of the present invention. In addition, it is contemplated that the lower chamber 36b may be configured to be simply filled with a volume of water or another suitable fluid, to provide an offset mass to cause the toy 10b/10c to come to rotational rest in the preferred position with the treat dispensing opening 18 situated with an upward orientation. This would require an animal to cause a substantial or full rotation of the toy 10b/10c to dispense a next respective treat. This arrangement also will prevent treats from inadvertently dropping through the opening 18 when the toy is not being rotated.

Another feature of the present invention enables easy access to the interior chamber 22 for filling and cleaning activities. This feature may be realized by configuring at least one of the first disk portion 12a and the second disk portion 12b to be removably fixed to the middle portion 14. An example embodiment of one possible arrangement providing for the removable fixing of the first disk portion 12a to the middle portion 14 is depicted in FIGS. 3A and 3B. As shown, the first disk portion 12a includes a short collar 40 having an outer threaded surface 40a, which is arranged to mate with and engage threading provided on an inner surface of the wall structure 16 at the first end 14a. The structure of FIGS. 3A and 3B, as well as others that are providable by skilled persons, may be included to enable easy access to the interior chamber 22 to support the filling of the chamber 22 with treats, and further, to enable an individual to easily clean the chamber 22. The removable fixing of the second disk portion 12b to the middle portion 14 is also contemplated, possibly instead of having first disk portion 12a arranged to be removably fixed to the middle portion.

In order to support the dispensing of treats of varying sizes, one or more removable annular rings 18a, which would be concentrically positioned within the opening 18, one within the other, as necessary to provide a means of adjusting the diameter of opening 18. An annular insert 18a may be arranged to be removably fixed to the wall structure 16 of the middle portion 14 (within or about the treat dispensing opening 18) via a suitable structure that may be, for example, provided by threading or a simple 'snap-in' arrangement. Accordingly, a plurality of annular rings 18a would enable the size of the opening 18 to be adjusted to accommodate differing sized treats, and encourage the preferred dispensing of one treat with every one or two revolutions of the toy 10a/10b.

While there have been described a plurality of the currently preferred embodiments of the present invention, along with basic methods of operation and use, those skilled in the art will recognize that other and further modifications may be made without departing from the invention, and it is intended to claim all modifications and variations as fall within the scope of the described invention and the appended claims.

What is claimed is:

1. A treat dispensing toy having a tilted center axis, comprising:
   a) first and second disk portions suitably spaced and substantially axially aligned along the center axis of the toy and extending radially therefrom to establish respective circumferential outer perimeters, wherein the first disk portion is configured having pre-determined diameter that is observably greater than a pre-determined diameter of the second disk portion; and
   b) a middle portion configured with a substantially cylindrical wall structure having a first end and a second end, and a pre-determined diameter less than the diameter of the second disk portion, the middle portion substantially aligned along the center axis of the toy and including a suitably sized treat dispensing opening located in the wall structure proximate to the second end;
   c) wherein the first disk portion is fixed to the middle portion at the first end to cap and close the first end, while the second disk portion is fixed to the middle portion at the second end to cap and close the second end;
   d) the treat dispensing toy specifically configured with the diameter of the first disk portion being suitably greater than the diameter of the second disk portion to cause the toy to remain within a somewhat restricted region of a ground supporting surface as the toy is caused to rotate by nudging impulses applied by an animal, and to further produce the tilted center axis when the toy is supported by the ground supporting surface causing any treats located within an interior chamber formed by the wall structure of the middle portion, and the first and second disk portions, to be drawn to the second end and eventually discharged thereat, at least one at a time, through the opening in the wall structure as the treat dispensing toy is rotated.

2. The treat dispensing toy in accordance with claim 1, wherein at least one of the first disk portion and the second disk portion are configured with a traction means provided about the circumferential outer perimeter of the first disk portion and the second disk portion.

3. The treat dispensing toy in accordance with claim 1, wherein an offset mass is provided to encourage the toy to come to rotational rest in a preferred position with the treat dispensing opening situated with an upward orientation after a nudging impulse is applied, the offset mass thereby encouraging the positioning of the opening with an upward orientation to require an animal to rotate the toy to dispense a next respective treat while preventing treats from inadvertently dropping through the opening when the toy is not being rotated.

4. The treat dispensing toy in accordance with claim 1, further including first and second hemispherical caps, with the first hemispherical cap fixed to the first disk portion and the second hemispherical cap fixed to the second disk portion, the first and second hemispherical caps included to prevent the toy from tipping on-end and being maintained with the center axis thereof in a position substantially orthogonal to the ground supporting surface.

5. The treat dispensing toy in accordance with claim 4, wherein at least one offset sub-chamber arranged to hold a mass is formed within an interior of the hemispherical cap, with the sub-chamber configured to be filled with a suitable mass which encourages the toy to come to rotational rest in the preferred position.

6. The treat dispensing toy in accordance with claim 5, wherein the mass is provided a volume of liquid placed within a respective offset sub-chamber.

7. The treat dispensing toy in accordance with claim 1, wherein at least one of the first and second disk portions is removably fixed to the middle portion to enable easy access to the interior chamber therein for filling and cleaning.

8. A treat dispensing toy arranged to dispense animal treats when rotated about a tilted center longitudinal axis, the treat dispensing toy comprising:
   a) a middle portion formed with a substantially cylindrical wall structure of a pre-determined diameter having a center axis substantially aligned with the tilted center longitudinal axis of the toy, the middle portion having a first end and a second end, and including a suitably sized treat dispensing opening located proximate to the second end in the cylindrical wall structure;
   b) a first disk portion substantially axially aligned along the center axis, and fixed to the middle portion at the first end thereof, the first disk portion having a circumferential outer perimeter with a pre-determined diameter selected to be greater than the diameter of the middle portion; and
   c) a second disk portion also substantially axially aligned with the cylindrical wall structure of the middle portion and fixed thereto at the second end, the second disk portion having a circumferential outer perimeter with a pre-determined diameter greater than that of the middle portion and less than that of the first disk portion;
   d) wherein the diameters of the first disk portion and second disk portion are selected so that when the treat dispensing toy is supported by a ground supporting surface the first end of the cylindrical middle portion is elevated above the second end causing any treats located within an interior chamber formed by the wall structure of the middle portion, the first disk portion, and the second disk portion, to be drawn to the second end and eventually discharged, at least one at a time, through the opening in the wall structure as the treat dispensing toy is rotated;
   e) the treat dispensing toy configured with the pre-determined diameter of the first disk portion being suitably and observably greater than the pre-determined diameter of the second disk portion to cause the toy to be maintained within a somewhat restricted area of the ground supporting surface as the toy is caused to rotate by nudging impulses applied by an animal.

9. The treat dispensing toy in accordance with claim 8, wherein at least one of the first disk portion and the second disk portion are configured with a traction means provided about the circumferential outer perimeter of the first disk portion and the second disk portion to aid in the rotating of the toy as the nudging impulses are applied.

10. The treat dispensing toy in accordance with claim 8, further including a means to prevent the toy from tipping on-end, thereby preventing the center axis to be maintained in a position substantially perpendicular to the ground supporting surface.

11. The treat dispensing toy in accordance with claim 10, wherein the means to prevent the toy from tipping on-end includes a first hemispherical cap-like protrusion fixed to the first disk portion and a second hemispherical cap-like protrusion fixed to the second disk portion.

12. The treat dispensing toy in accordance with claim 11, wherein an offset mass is provided within at least one of the first and second cap-like protrusions to encourage the toy to rotate and come to rotational rest in a preferred position with the treat dispensing opening situated with an upward orientation, the offset mass thereby encouraging the positioning of the treat dispensing opening upward when at rotational rest to require an animal to nudge and rotate the toy to dispense a next respective treat.

13. The treat dispensing toy in accordance with claim 12, wherein at least one mass holding offset sub-chamber is formed within an interior of the hemispherical cap-like protrusion, with the sub-chamber configured to be filled with an offset mass.

14. The treat dispensing toy in accordance with claim 13, wherein the offset mass is provided as a volume of water placed within a respective lower offset sub-chamber.

15. The treat dispensing toy in accordance with claim 8, wherein the treat dispensing opening includes at least one removable annular ring removably fixed to the wall structure of the middle portion to enable the size of the opening to be adjusted to accommodate differing sized treats.

16. The treat dispensing toy in accordance with claim 8, wherein at least one of the first and second disk portions is removably fixed to the middle portion to enable easy access to the interior chamber therein for filling and cleaning.

* * * * *